(12) United States Patent
Sano

(10) Patent No.: US 9,347,785 B2
(45) Date of Patent: May 24, 2016

(54) NAVIGATION DEVICE FOR DISPLAYING NAME OF GUIDANCE INTERSECTION

(75) Inventor: Yoko Sano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/236,223

(22) PCT Filed: Aug. 24, 2011

(86) PCT No.: PCT/JP2011/004697
§ 371 (c)(1),
(2), (4) Date: Jan. 30, 2014

(87) PCT Pub. No.: WO2013/027244
PCT Pub. Date: Feb. 28, 2013

(65) Prior Publication Data
US 2014/0172299 A1   Jun. 19, 2014

(51) Int. Cl.
*G01C 21/36* (2006.01)
*G08G 1/0969* (2006.01)

(52) U.S. Cl.
CPC ........ *G01C 21/3626* (2013.01); *G01C 21/3673* (2013.01); *G08G 1/0969* (2013.01)

(58) Field of Classification Search
CPC ............. G08G 1/0969; G01C 21/3626; G01C 21/3673
See application file for complete search history.

(56) References Cited

U.S. PATENT DOCUMENTS

| 7,076,409 B2 * | 7/2006 | Agrawala et al. ................. 703/2 |
| 8,131,466 B2 * | 3/2012 | Iwatani .......................... 701/437 |
| 8,548,732 B2 * | 10/2013 | Tsuji ............................ 701/409 |
| 2008/0208466 A1 | 8/2008 | Iwatani |
| 2009/0024319 A1 | 1/2009 | Tsuji |
| 2010/0114480 A1 * | 5/2010 | Sugiyama et al. ............ 701/207 |

FOREIGN PATENT DOCUMENTS

| JP | 3-84416 A | 4/1991 |
| JP | 3-257324 A | 11/1991 |
| JP | 4-305116 A | 10/1992 |
| JP | 8-145708 A | 6/1996 |
| JP | 10-47988 A | 2/1998 |
| JP | 10-89993 A | 4/1998 |
| JP | 2005-265573 A | 9/2005 |
| JP | 2008-209359 A | 9/2008 |
| JP | 2009-25048 A | 2/2009 |
| JP | 2010-112732 A | 5/2010 |

* cited by examiner

*Primary Examiner* — Todd Melton
(74) *Attorney, Agent, or Firm* — Birch, Stewart, Kolasch & Birch, LLP

(57) ABSTRACT

A navigation device includes: an intersection attribute determination unit 731 that determines a direction of a left/right turn at a guidance target intersection on a guidance route on the basis of route information on the guidance route; a display position decision unit 732 that decides a display position for a name of the guidance target intersection on a side opposite to the direction of the right/left turn determined by the intersection attribute determination unit 731 when viewed from an entrance link to the guidance target intersection; a drawing data generation unit 733 that generates drawing data on the name of the guidance target intersection; and an image data output unit 9 that causes a display device 10 to display the drawing data generated by the drawing data generation unit 733 at the display position decided by the display position decision unit 732.

4 Claims, 13 Drawing Sheets

(a)

(b)

(a)

(b)

(a)

(b)

(a)

(b)

NAVIGATION DEVICE FOR DISPLAYING NAME OF GUIDANCE INTERSECTION

TECHNICAL FIELD

The present invention relates to a navigation device that displays a name of an intersection located on a guidance route on a map.

BACKGROUND ART

For example, in Patent Document 1, there is described a device that performs display such that a name of an intersection is not overlapped on a guidance route. From among rectangular regions into which a display screen is divided in a grid, the device selects one region in accordance with a preferential condition of: no inclusion of an own vehicle mark, the guidance route, and a general road; and a location at the upper part of the screen, and determines the inside of the region as an intersection name display region.

Also, in Patent Document 2, there is disclosed a vehicle navigation device that displays a name of a crossing road crossing with a traveling scheduled road at a position in which the name is located in the vicinity of the traveling scheduled road, and which is obviously recognizable as a road name indicating the crossing road.

PRIOR ART DOCUMENTS

Patent Documents

Patent Document 1: Japanese Patent Application Publication No. H10-89993
Patent Document 2: Japanese Patent Application Publication No. 2009-25048

SUMMARY OF THE INVENTION

Problems to be Solved by the Invention

In a display of the name of an intersection by a conventional navigation device, there are mainly the following two formats:
(1) Case of Displaying Name of Intersection on Map (Road Map or Street Map)

FIG. 1 is a view showing a conventional example in which the name of an intersection is displayed on a map. The name of the intersection displayed on the map is a name character string that is stored as map data for display such as "Toranomon" or "Tameikei" shown in FIG. 1. Additionally, the intersection name is displayed in the same manner even during route guidance or even when the route is unset.

A character string of the intersection name is displayed in principle at a position on a map that is set in advance in a map database or at a position away from the position of the intersection on the map by a given distance in a given direction.
(2) Case of Displaying Name of Guidance Target Intersection on Intersection Guide View (Enlarged Guide View)

FIG. 2 is a view showing a conventional example in which the name of a guidance target intersection is displayed on an intersection guide view. In FIG. 2, a character string of an intersection name is displayed on the intersection guide view (enlarged guide map on the right-hand side of FIG. 2) to be displayed when an own vehicle approaches the guidance target intersection during route guidance. In this case, the character string of the intersection name is displayed in principle at a fixed position on a screen and is not associated with the position of the intersection on a map. Examples of the fixed position on the screen include a position located in the vicinity of the horizontal center on the screen and in the vertically upper part thereof.

In the format (1), in most cases, the intersection name is displayed with overlapped on a route line or the displayed intersection name is easily confused with a character string of another name. In addition, since all the intersection names on the map are not displayed, the name of the guidance target intersection may not be displayed during route guidance. In this case, a driver who is about to turn right/left cannot be provided with one of clues to specify a point for the right/left turn.

On the other hand, in the format (2), a driver cannot confirm (visually recognize) the name of an intersection that is not displayed on a wide-area map (view on the left-hand side of FIG. 2) until the own vehicle approaches the intersection, and the intersection guide view (enlarged guide view) is displayed. In addition, it is difficult to check at which position on the map the intersection is located.

By contrast, in Patent Document 1, when the map displayed on the screen moves with a movement of the own vehicle, the position of the intersection on the map does not interlock with the position at which the intersection name is displayed. For this reason, the position of the intersection indicated by the intersection name cannot be checked in association with the map. In addition, an acquisition source of the intersection name is not specified, and there is no statement on the requisite that any intersection having a name should be displayed with its name.

On the other hand, since Patent Document 2 aims at displaying the name of a road, no consideration is given to displaying a character string constantly in an upright orientation even when the map rotates. In addition, since Patent Document 2 pertains to the name of the cross road crossing the traveling scheduled road, there is no remark on how to avoid an overlapping display of the name on the route at the point for the right/left turn.

Therefore, even when the conventional techniques as represented in Patent Documents 1 and 2 are applied with no alteration to the display of the name of the guidance target intersection, the problems mentioned in the format (1) or format (2) cannot be solved.

For a driver driving on a route with following guidance provided by a navigation device, the name of an intersection on the route, especially the name of an intersection at which the driver should turn right/left, is more important information than an address or a name of a facility. Accordingly, any intersection having a name on the route should be necessarily displayed in a name character string.

At this time, it is desirable that the name of an intersection on a map be clearly displayed to indicate at which position on the map the intersection is located without hiding the display of the route.

However, when the intersection name is displayed at a position away from the guidance route for the avoidance of an overlapping on the guidance route, it is hard to understand at which position on the map the corresponding intersection name is located.

On the other hand, when the name is displayed near the intersection on the guidance route for easier recognition of the position of the intersection indicated by the intersection name, the name is displayed overlapping on the guidance route, so that the shape of the guidance route and a situation at the corresponding intersection is hard to see.

The invention has been made to solve the foregoing problems, and an object of the invention is to obtain a navigation device that can display clearly the intersection name on the route.

Means for Solving the Problems

A navigation device according to the invention includes: a determination unit that determines a direction of a left/right turn at a guidance target intersection on the guidance route on the basis of route information on the guidance route; a display position decision unit that decides a display position for a name of the guidance target intersection displayed in a display in conjunction with an movement of an own vehicle at a position which is on a side opposite to the direction of the right/left turn determined by the determination unit when viewed from an entrance link to the guidance target intersection and which is at a distance corresponding to a width of a character string of the name of the guidance target intersection from the guidance target intersection, in response to update of the position of the own vehicle; and an output unit that displays drawing data on the name of the guidance target intersection at the display position decided by the display position decision unit.

Effect of the Invention

According to the invention, there is an advantageous effect that the name of the intersection on the route can be displayed clearly.

BEST MODE FOR CARRYING OUT THE INVENTION

In the following, in order to describe the present invention in more detail, embodiments for carrying out the invention will be described with reference to the attached drawings.
Embodiment 1

Figure 1:
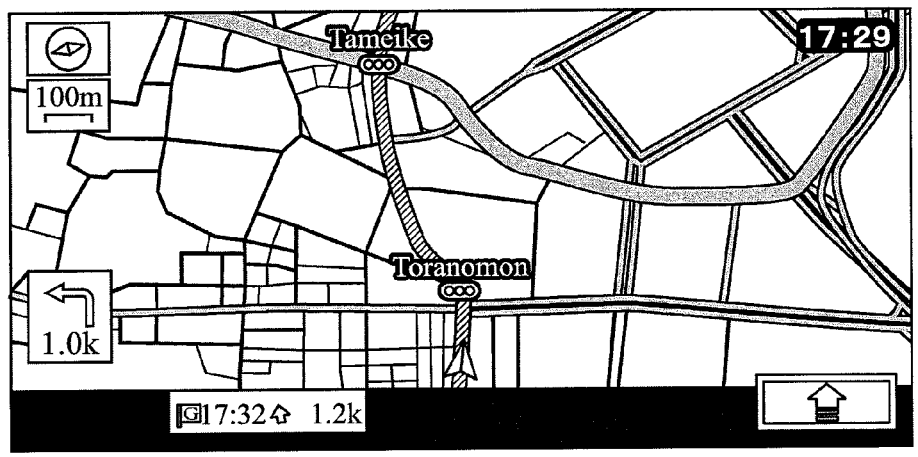
FIG. 1 is a view showing a conventional example in which a name of an intersection is displayed on a map.
Figure 2:
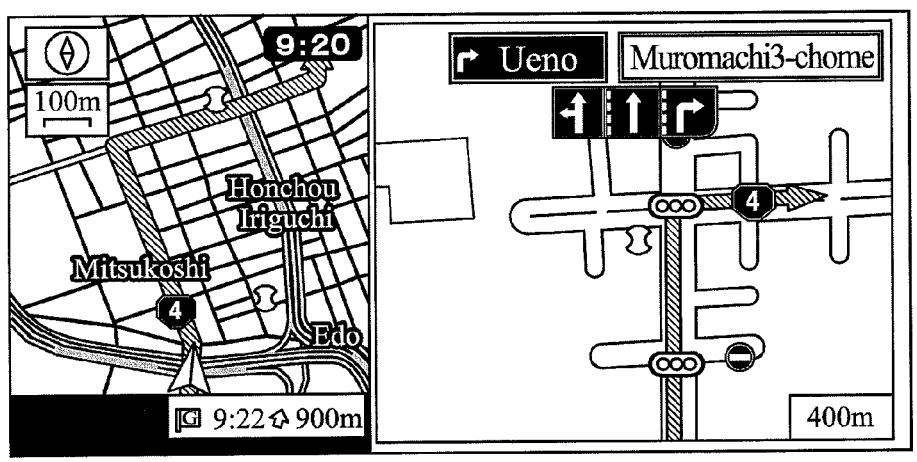
FIG. 2 is a view showing a conventional example in which a name of a guidance target intersection is displayed in an intersection guide view.
Figure 3:
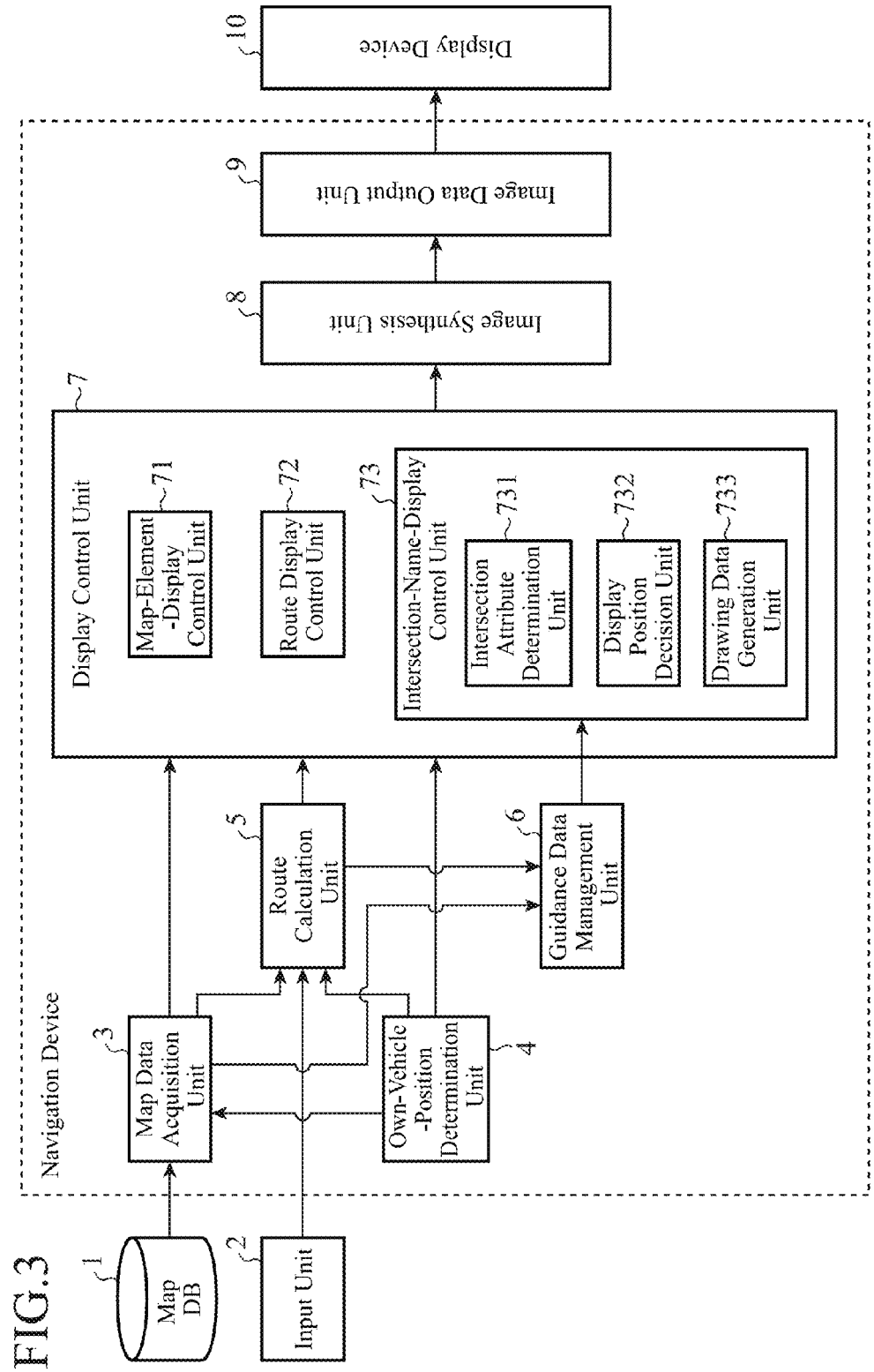
FIG. 3 is a block diagram showing a configuration of a navigation device according to Embodiment 1 of the invention.

FIG. 3 is a block diagram showing a configuration of a navigation device according to Embodiment 1 of the invention. As shown in FIG. 3, the navigation device according to Embodiment 1 is the one that searches a route using map data in a map database (DB) 1, a destination inputted to an input unit 2, and a position of an own vehicle obtained in an own-vehicle-position determination unit 4 to provide guidance on a route of a searched result, and includes a map data acquisition unit 3, the own-vehicle-position determination unit 4, a route calculation unit 5, a guidance data management unit 6, a display control unit 7, an image synthesis unit 8, and an image data output unit 9.

The map DB 1 is a database that stores map data used in navigation processing. For example, the map DB 1 is established in a hard disk device equipped in the navigation device according to Embodiment 1, a storage media that is reproducible in a storage media reproduction device, and/or the like.

Alternatively, it may be configured such that the map DB 1 is established in an external server device connected to a communication network, and that the map data acquisition unit 3 of the navigation device acquires the map data from the external server device using communication means.

Note that the map data stored in the map DB 1 includes display data and guidance data.

The display data is map data used for map display irrespective of route guidance. For example, in road data in the display data, in order to prevent a displayed map from being complicated, representative ones to be displayed of names of intersections on a road are determined in advance at the manufacturer of the map DE 1, and names of the other intersections are not registered in the display data. When route guidance is not provided, the map display is normally performed in the display device 10 using the data for map display in the map DB 1.

On the other hand, the guidance data is map data used for route guidance. Road data in the guidance data includes a series of information needed for route guidance on the corresponding road in order to carry out the route guidance precisely. For example, in road data in the guidance data, names of all the intersections on the road are registered.

The input unit 2 is an input unit that receives a setting of a destination and various operations by a user, and implemented by, for example, a touch panel mounted on a screen of the display device 10.

The map data acquisition unit 3 is an acquisition unit that acquires the map data from the map DB 1, and acquires map data related to a map including a position of an own vehicle determined by the own-vehicle-position determination unit 4.

The own-vehicle-position determination unit 4 is a determination unit that determines positional information (latitude/longitude) of the own vehicle, and determines a current position of the own vehicle from, e.g., analyzed results of GPS (Global Positioning System) radio waves received by a GPS receiver (not shown).

The route calculation unit 5 calculates a guidance route from a departure point to a destination using the destination inputted to the input unit 2, the positional information of the own vehicle acquired in the own-vehicle-position determination unit 4, and the map data acquired from the map DB 1 by the map data acquisition unit 3.

The guidance data management unit 6 is the one that acquires the guidance data related to the guidance route calculated by the route calculation unit 5 from the map DB 1 through the map data acquisition unit 3, and holds/manages the guidance data.

The display control unit 7 generates an image to be displayed on a map screen of the display device 10 on the basis of the map data acquired from the map data acquisition unit 3 and the guidance data related to the guidance route acquired from the guidance data management unit 6. As functional components therefor, there are provided with a map-element-display control unit 71, a route display control unit 72, and an intersection-name-display control unit 73.

The map-element-display control unit 71 generates an image of a map element to be displayed on the map screen.

On the other hand, the route display control unit 72 generates an image of the guidance route to be displayed on the map screen.

The intersection-name-display control unit 73 is a control unit that generates an image of an intersection name character string to be displayed on the map screen on the basis of the information related to the intersection on the route included in the guidance data related to the guidance route; as functional components therefor, there are provided with an intersection attribute determination unit 731, a display position decision unit 732, and a drawing data generation unit 733.

The intersection attribute determination unit 731 is the one that determines attributes of an intersection (intersection name, whether or not it is a guidance target intersection, a direction of course change, and so on) on the basis of the information related to the intersections on the route held by the guidance data management unit 6.

The display position decision unit 732 calculates a display position for the intersection name character string in a screen coordinate system in response to a change in a direction of map display and its coordinate values in a vertical direction, on the basis of the attributes of the intersection determined by the intersection attribute determination unit 731 and location information on a current location in the map data inputted from the map data acquisition unit 3, and decides a display position for the intersection name character string.

The drawing data generation unit 733 allocates a character size, a drawing color, and the like with respect to the intersection name character string, and generates drawing data to be displayed on the map screen.

The image synthesis unit 8 combines images generated in the map-element-display control unit 71, the route display control unit 72, and the intersection-name-display control unit 73 to generate map display data to be displayed on the screen of the display device 10. The image data output unit 9 is the one that outputs and displays the map display data generated by the image synthesis unit 8 to the display device 10. In particular, the image data output unit 9 causes the display device 10 to display the drawing data generated by the drawing data generation unit 733 at the display position decided by the display position decision unit 732. Additionally, the display device 10 is a display unit that displays the map display data from the image data output unit 9.

Next, a description will be given of an operation thereof.

Figure 4:
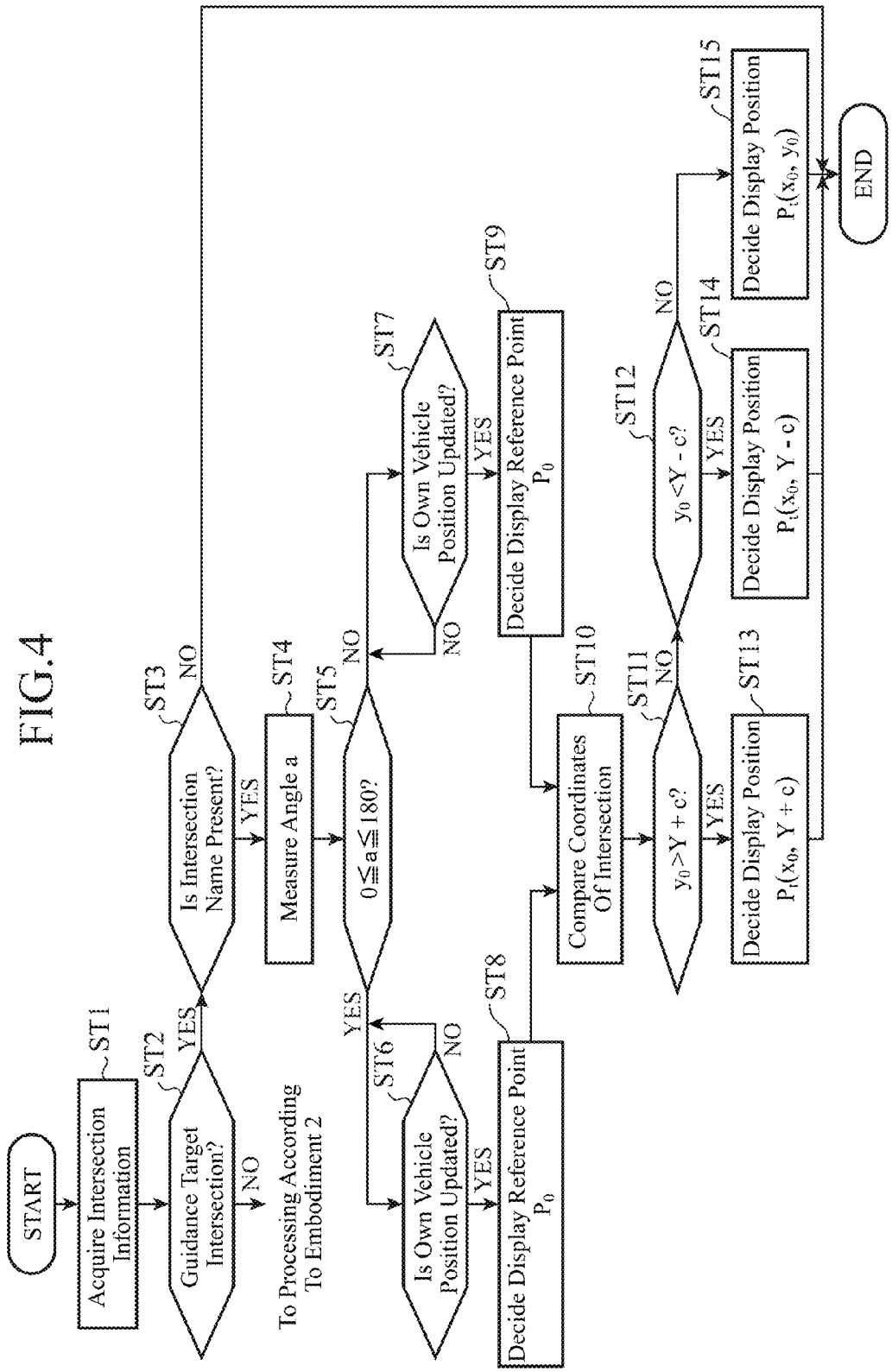
FIG. 4 is a flow chart showing a flow of processing of deciding a display position for an intersection name by the navigation device according to Embodiment 1.

FIG. 4 is a flow chart showing a flow of processing of deciding the display position for the intersection name by the navigation device according to Embodiment 1, and particularly shows processing of displaying a name of a guidance target intersection closest to the current location on the route. Note that a processing flow of FIG. 4 is started when the guidance route is set and when the own vehicle passes through the guidance target intersection.

In addition, the intersection to be subjected to the processing is the one on the route located between the position of the own vehicle and the closest guidance target intersection.

First, as a preliminary stage to the flow of FIG. 4, the route calculation unit 5 calculates the guidance route from the departure point to the destination, on the basis of the own vehicle position determined by the own-vehicle-position determination unit 4, the position of the destination inputted to the input unit 2, the map data acquired from the map DB 1 by the map data acquisition unit 3.

Subsequently, the guidance data management unit 6 acquires from the map DB 1 the guidance data related to the guidance route calculated by the route calculation unit 5 through the map data acquisition unit 3.

The intersection attribute determination unit 731 of the intersection-name-display control unit 73 acquires the information related to the intersections (hereinafter, referred to as intersection information) on the route held by the guidance data management unit 6 (Step ST1). The intersection information acquired at this stage includes intersection types, intersection names, coordinates thereof on the map based on the longitudes/latitudes, entrance (approach) links, and exit links.

The intersection attribute determination unit 731 determines whether or not the corresponding intersection is the guidance target intersection on the basis of the acquired intersection information (Step ST2). For example, in the route information on the guidance route, a node of the guidance target is defined and, on the basis of whether or not the node is the intersection, and so on, the guidance target intersection can be determined. In this manner, the guidance target intersection closest to the own vehicle on the route is determined.

When the node is not the guidance target intersection located on the route (NO in Step ST2), the processing shifts to the one according to Embodiment 2 described later. That is, when the intersection is determined the one passed through before the guidance target intersection, the processing of Embodiment 2 is performed.

On the other hand, when the node is the closet guidance target intersection to the own vehicle located on the route (YES in Step ST2), the intersection attribute determination unit 731 determines presence/absence of the name of each of the guidance target intersections on the route on the basis of the intersection information (Step ST3). When the name of the guidance target intersection (hereinafter, referred to as guidance target intersection name) is absent (NO in Step ST3), the processing is ended.

When the name of the guidance target intersection is present (YES in Step ST3), since the guidance target intersection name is acquired from the guidance data in Step ST1, the intersection name can be displayed even when the name of the intersection is not registered in the display data.

Next, the display position decision unit 732 receives the attribute information from the intersection attribute determination unit 731 and measures, on the basis of the attribute information related to the closest guidance target intersection on the route, an angle a formed between the entrance link and the exit link based on the node of the corresponding guidance target intersection serving as a base point (Step ST4).

Figure 5:
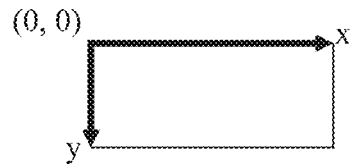
FIG. 5 is a view illustrating a flow of decision processing of a display reference point for a name of a guidance target intersection.
Figure 5:
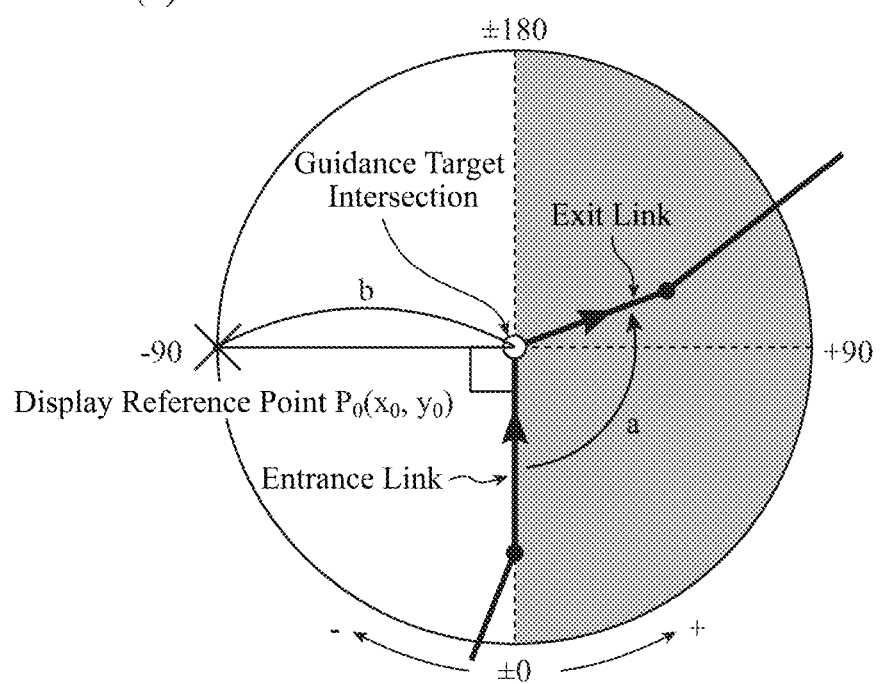

FIG. 5 is a view illustrating processing of deciding a display reference point for the guidance target intersection name. Note that, as shown in FIG. 5(*a*), FIG. 5(*b*) shows the processing in a positional relationship in a "screen coordinate system" having the original (0,0) in the upper left part on the screen of the display device 10.

The display position decision unit 732 defines, on the basis of the attribute information on the closest guidance target intersection on the route, a circle having a radius b around the node of the guidance target intersection shown in FIG. 5(*b*). At this point, around the node of the guidance target intersection, plus and minus 180 degrees are defined counterclockwise and clockwise, respectively. That is, the value of the angle a is positive when the own vehicle turns right at the corresponding intersection, and is negative when the own vehicle turns left at the intersection.

Also, the radius b is determined on the basis of the following expression. In this connection, Character Width is the width of characters set in advance for the name of the guidance target intersection, and Number of Name Characters is the number of characters in the name of the guidance target intersection in the attribute information; also, mb is an arbitrary value showing a predetermined space in the name character string of the guidance target intersection.

$$b=(\text{Character Width} \times \text{Number of Name Characters})/2+mb.$$

When measuring the angle a, the display position decision unit 732 determines whether or not the angle a is not less than 0 degrees and not more than 180 degrees, i.e., whether or not the exit link is on the right side of the entrance link (Step ST5). At this stage, when the angle a is not less than 0 degrees and not more than 180 degrees (YES in Step ST5), the display position decision unit 732 determines whether or not the own vehicle position is updated (Step ST6), and shifts to Step ST8 when the own vehicle position is updated.

On the other hand, when the angle a is not within the range of not less than 0 degrees and not more than 180 degrees (NO in Step ST5), the display position decision unit 732 determines whether or not the own vehicle position is updated (step ST7), and shifts to Step ST9 when the own vehicle position is updated.

In Steps ST8 and ST9, the display position decision unit 732 converts the coordinates on the map of the guidance target intersection to those in the screen coordinate system, and decides a display reference point $P_0(x_0, y_0)$ for the name character string of the guidance target intersection in the screen coordinate system in response to the value of the angle a in accordance with the following relation.

(a) When $0 \leq a \leq 180$ is Satisfied

A point of intersection of a line at −90 degrees to the entrance link around the guidance target intersection with the circle having the radius b is defined as the display reference point $P_0$.

(b) When $-180 < a < 0$ is Satisfied

A point of intersection of a line at +90 degrees to the entrance link around the guidance target intersection with the circle having the radius b is defined as the display reference point $P_0$.

Figure 6:
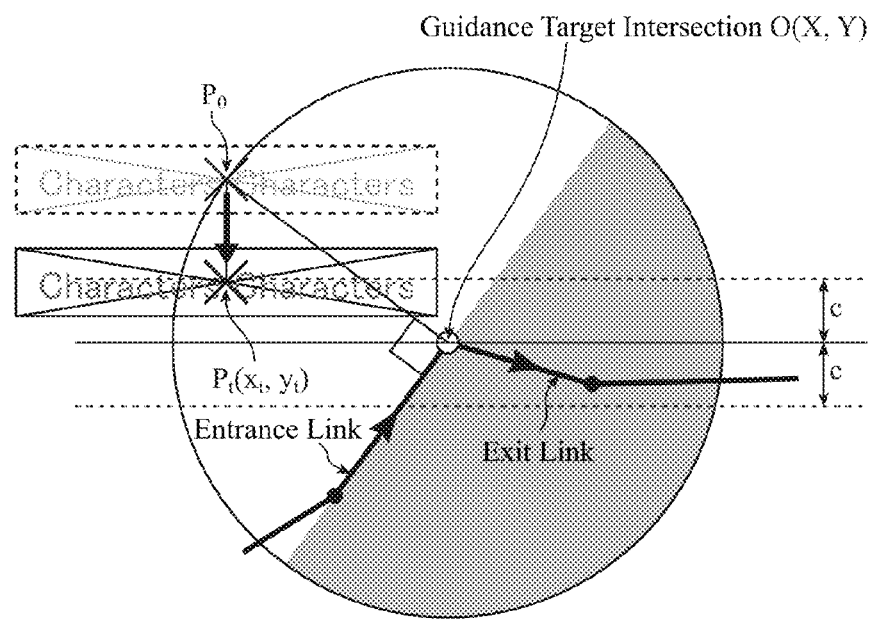
FIG. 6 is a view illustrating decision processing of a display position for the name of the guidance target intersection.

When deciding the display reference point $P_0$, the display position decision unit 732 compares the coordinates of the guidance target intersection to those of the display reference point $P_0$ (Step ST10). In this connection, as shown in FIG. 6, the display position decision unit 732 evaluates a positional relationship between the display reference point $P_0(x_0, y_0)$ and the guidance target intersection $O(X, Y)$ in the screen coordinate system, and decides the y-coordinate ($y_t$) of the display position $P_t(x_t, y_t)$ of the name character string of the guidance target intersection in response to the evaluated result. Here, the x-coordinate ($x_t$) constantly follows the x-coordinate ($x_0$) of the display reference point $P_0$. Note that c is an arbitrary fixed value obtained by adding a predetermined space to the height of the characters set in advance for the name of the guidance target intersection.

When $y_0 > Y+c$ (y-Coordinate of Display Reference Point $P_0$>y-Coordinate of Guidance Target Intersection+c) is satisfied (YES in Step ST11), the display position decision unit 732 fixes $y_t$ to $y_t = Y+c$ (y-Coordinate of Character String Display Position $P_t$=y-Coordinate of Guidance Target Intersection+c). That is, the display position $P_t$ for the name character string of the guidance target intersection is set to ($x_0$, Y+c) (Step ST13).

On the other hand, when $y_0 > Y+c$ is not satisfied (NO in Step ST11) and when $y_0 < Y-c$ (y-Coordinate of Display Reference Point $P_0$<y-Coordinate of Guidance Target Intersection−c) is satisfied (YES in Step ST12), the display position decision unit 732 fixes $y_t$ to $y_t = Y-c$ (y-Coordinate of Character String Display Position $P_t$=y-Coordinate of Guidance Target Intersection−c). That is, the display position $P_t$ for the name character string of the guidance target intersection is set to ($x_0$, Y−c) (Step ST14).

When neither $y_0 > Y+c$ nor $y_0 < Y-c$ is satisfied (NO in Step ST12), the display position decision unit 732 determines the display reference point $P_0$ as the display position $P_t$ for the name character string of the guidance target intersection without alteration (Step ST15).

As mentioned above, in Embodiment 1, the display reference point $P_0$ for the name character string is decided so as to be on the side opposite to the direction of a right/left turn at the guidance target intersection using the circle having the radius b taking into consideration the character width of the name character string, the number of characters therein, and a predetermined space; the display position $P_t$ is decided on the basis of the display reference point $P_0$.

By doing so, the display position $P_t$ can be decided such that the name character string of the guidance target intersection is not overlapped on an entrance-side route to the corresponding guidance target intersection and an exit-side route therefrom as much as possible.

Every time the own vehicle position is updated in Step ST6 or ST7, the processing from Step ST8 or Step ST9 to Step ST15 mentioned above is performed, as shown in FIG. 6, which can prevent the display position for the name character string of the guidance target intersection from going excessively far away from the position of the guidance target intersection due to the rotation of the orientation of map display when heading up display is performed. Note that FIG. 6 is also shown in a positional relationship in the screen coordinate system.

The drawing data generation unit 733 allocates, on the basis of the attribute information on the corresponding guidance target intersection that is received from the intersection attribute determination unit 731, the character size, the drawing color, and the like to the name character string of the corresponding guidance target intersection to generate the drawing data related to the name character string of the corresponding guidance target intersection.

The image synthesis unit 8 combines the images generated in the map-element-display control unit 71, the route display control unit 72, and the intersection-name-display control unit 73 to generate the map display data to be displayed on the screen of the display device 10.

The map display data becomes image data in which the drawing data on the name character string of the guidance target intersection is displayed at the display position $P_t$ decided by the display position decision unit 732. The image data output unit 9 outputs the map display data generated in the image synthesis unit 8 to the display device 10.

Figure 7:
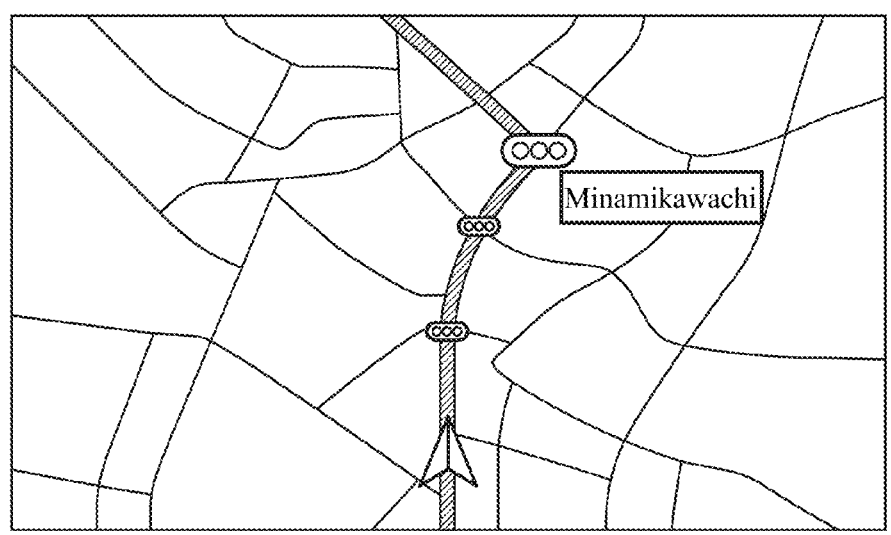
FIG. 7 is a view showing an example of a map screen displaying the name of the guidance target intersection.

In this manner, a map as shown in FIG. 7 is displayed on the display device 10. Every time the own vehicle position is updated, the name "Minamikawachi" of the guidance target intersection is displayed on the side opposite to the direction of the right/left turn of the own vehicle at the closest guidance target intersection. Thus, in Embodiment 1, only the name of the closest guidance target intersection is displayed in response to the movement of the own vehicle.

Note that, in the example of FIG. 7, at the display position decided by the display position decision unit 732, a background plate is drawn before the name character string of the guidance target intersection is drawn.

Also, depending on presence/absence of a traffic signal at the intersection, that is, whether or not the image of the traffic signal is displayed at the intersection, the value of the radius b of the circle defined when the display reference point $P_0$ is decided may be changed.

Further, depending on the size of the image of the traffic signal, the value of the radius b of the circle defined when the display reference point $P_0$ is decided may be changed.

As mentioned above, according to Embodiment 1, the navigation device includes: the intersection attribute determination unit 731 that determines, on the basis of the route information on the guidance route, the direction of the right/left turn at the guidance target intersection on the corresponding guidance route; the display position decision unit 732 that decides the display position for the name of the guidance target intersection on the side opposite to the direction of the right/left turn determined by the intersection attribute determination unit 731 when viewed from the entrance link to the guidance target intersection; the drawing data generation unit 733 that generates the drawing data on the name of the guidance target intersection; and the image data output unit 9 that causes the display device 10 to display the drawing data generated by the drawing data generation unit 733 at the display position decided by the display position decision unit 732.

In such a way, when the display position for the name of the guidance target intersection is decided on the side that is opposite to the direction of the right/left turn of the own vehicle at the closest guidance target intersection, every time the own vehicle position is updated, the name of the guidance target intersection can be displayed clearly.

Also, according to Embodiment 1, the display position decision unit 732 decides the display reference point $P_0$ at the position which is located on the side opposite to the direction of the right/left turn determined by the intersection attribute determination unit 731 when viewed from the entrance link to the guidance target intersection, and which is at a predetermined distance from the intersection, and decides the display position for the name of the corresponding intersection on the basis of the display reference point $P_0$ such that the display position is not excessively far away from the intersection in the vertical direction of the screen coordinate system.

In such a way, when the display position for the name of the guidance target intersection is decided on the side opposite to the direction of the right/left turn such that the display position is not excessively far away in the vertical direction, the name is displayed near the guide target intersection without overlapping on the entrance route. As a result, since the direction of the right/left turn is easily determined on the basis of the position of the name character string, and since the character string does not overlap on the route, the route and the name character string are easily viewable.

Embodiment 2

In the above Embodiment 1, there is shown the case in which the name of the character string of the closest guidance target intersection on the route is displayed; however, in Embodiment 2, a description will be given of a case where names of intersections passed through from a current location of an own vehicle to the closest guidance target intersection on a route are displayed.

Note that a navigation device according to Embodiment 2 is the same as that in the above Embodiment 1, and processing of displaying the names of the intersections passed through before the closest guidance target intersection is added to the display algorithm of the intersection name. Accordingly, see FIG. 3 for a configuration of the navigation device according to Embodiment 2.

Next, a description will be given of an operation thereof.

Figure 8:
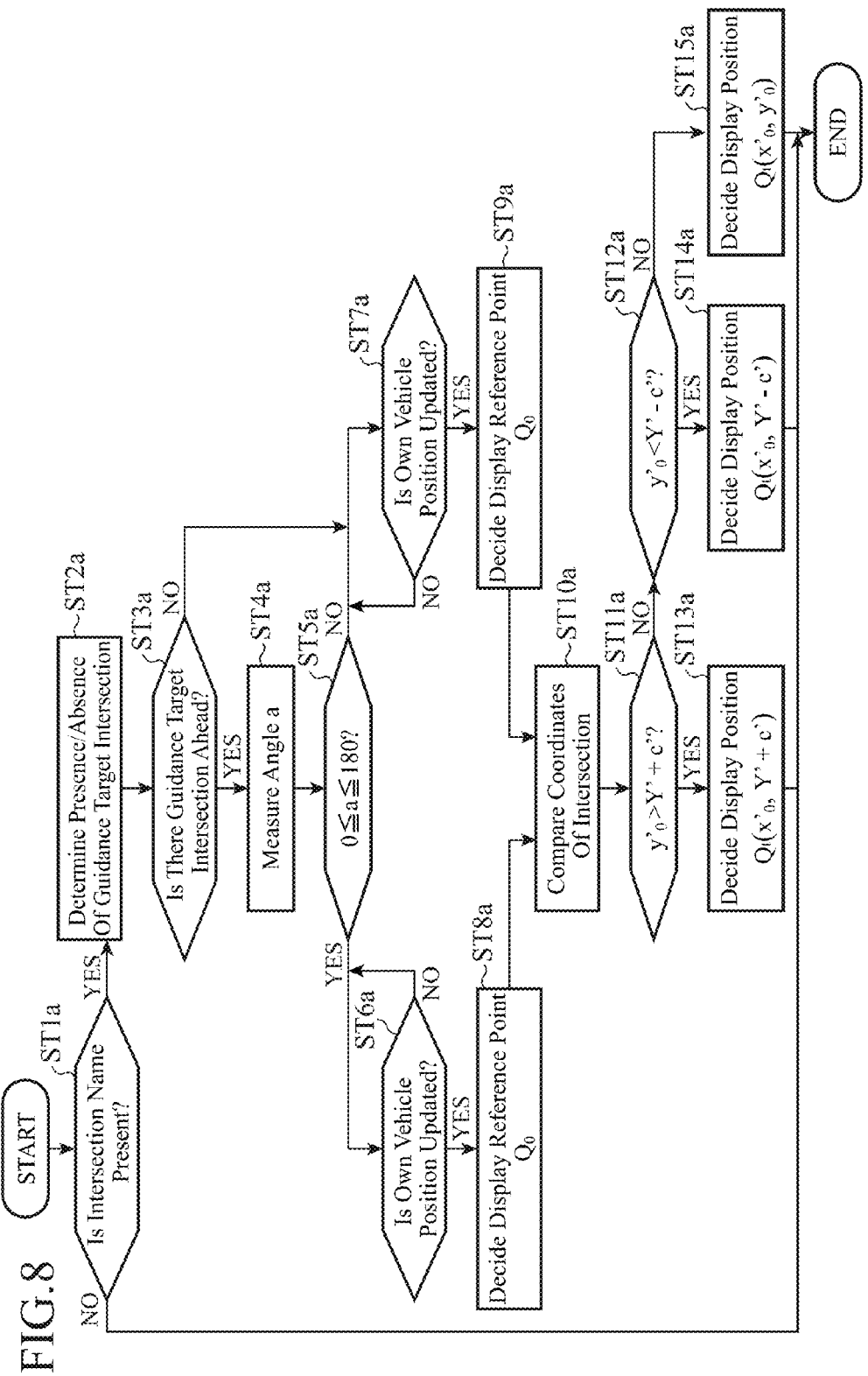
FIG. 8 is a flow chart showing a flow of processing of deciding a display position for an intersection name by a navigation device according to Embodiment 2 of the invention.

FIG. 8 is a flow chart showing a flow of processing of determining a display position for the intersection name by the navigation device according to Embodiment 2 of the invention, and particularly shows processing of displaying the names of the intersections passed through on the route from the current location to the closest guidance target intersection.

Note that the flow shown in FIG. 8 is carried out when, in Step ST2 of FIG. 4 shown in the above Embodiment 1, the intersection is not the guidance target intersection.

First, an intersection attribute determination unit 731 determines, on the basis of intersection information acquired from a guidance data management unit 6, presence/absence of an intersection name for each of intersections located on a guidance route (Step ST1*a*). At this time, when the intersection name is absent (NO in Step ST1*a*), the processing is ended.

When the intersection name is present (YES in Step ST1*a*), the intersection attribute determination unit 731 determines, on the basis of an own vehicle position acquired from an own-vehicle-position determination unit 4 and the intersection information, whether or not the intersections present on the guidance route include the guidance target intersection located ahead from a current own vehicle position to a destination (Step ST2*a*). At this stage, when the guidance target intersection is present ahead (YES in Step ST3*a*), the processing moves to Step ST4*a*.

On the other hand, when the guidance target intersection is absent ahead (NO in Step ST3*a*), the processing shifts to Step ST7*a*. Examples of the case where the guidance target intersection is absent ahead include cases where there is no guidance target intersection on the route to the destination, and where the information is not acquired for some reason.

In Step ST4*a*, a display position decision unit 732 receives attribute information from the intersection attribute determination unit 731 and measures, on the basis of attribute information related to the closest guidance target intersection on the route, an angle a formed between an entrance link and an exit link based on a node of the corresponding guidance target intersection serving as a base point.

Figure 9:
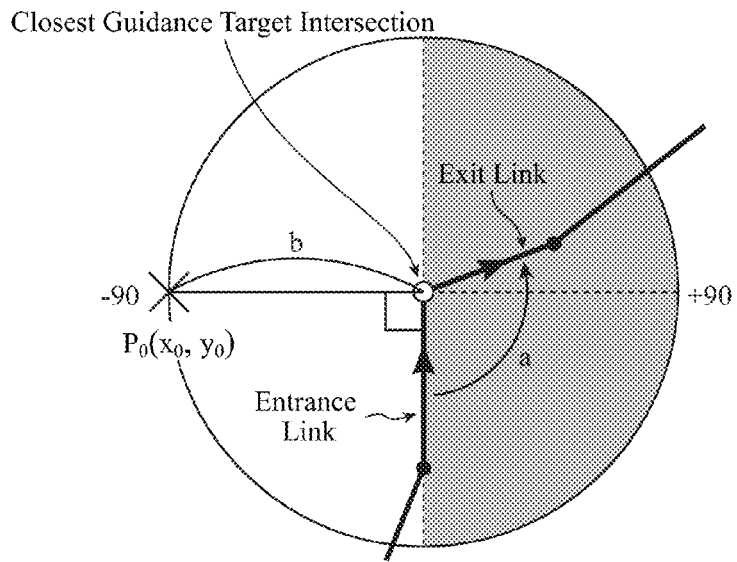
FIG. 9 is a view illustrating decision processing of a display reference point for the intersection name according to Embodiment 2.
Figure 9:
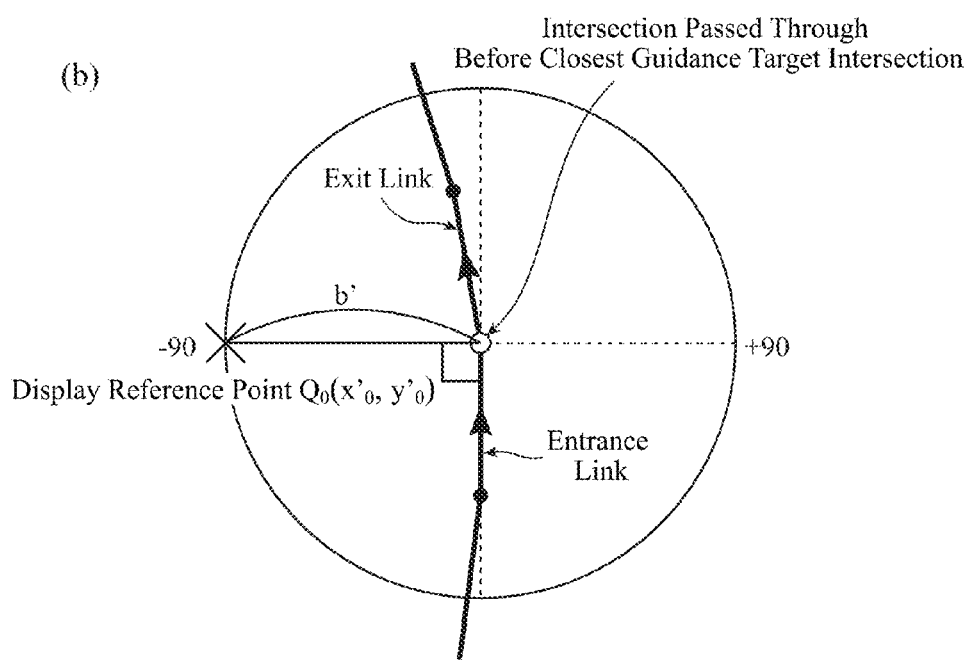

FIG. 9 is a view illustrating processing of determining a display reference point for the intersection name according to Embodiment 2. Note that FIGS. 9(a) and 9(b) are shown in a screen coordinate system.

When measuring the angle a of the closest guidance target intersection a in the same method as that in Embodiment 1, the display position decision unit 732 determines whether or not the angle a is not less than 0 degrees and not more than 180 degrees, that is, whether or not the exit link is on the right side of the entrance link (Step ST5a). When the angle a is not less than 0 degrees and not more than 180 degrees (YES in Step ST5a), the display position decision unit 732 determines whether or not the own vehicle position is updated (Step ST6a) and shifts to Step ST8a when the own vehicle position is updated.

On the other hand, when the angle a is not within the range of not less than 0 degrees and not more than 180 degrees (NO in Step ST5a), the display position decision unit 732 determines whether or not the own vehicle position is updated (step ST7a) and shifts to Step ST9a when the own vehicle position is updated.

In Steps ST8a and ST9a, the display position decision unit 732 converts the coordinates of an intersection on the map to those in the screen coordinate system, and decides a display reference point $Q_0(x'_0, y'_0)$ in the screen coordinate system of the name character string of each of the intersections passed through before the closest guidance target intersection.

First, the display position decision unit 732 defines, on the basis of the attribute information on each of the intersections passed through before the closest guidance target intersection, a circle having a radius b' around the node of the corresponding intersection shown in FIG. 9(b). In this connection, the radius b' is determined on the basis of the following expression, and Character Width is the width of characters set in advance for the name of each of the intersections (intersections other than the guidance target intersection), and Number of Name Characters is the number of characters in the name of each of the intersections in the attribute information; note that m'b is an arbitrary value showing a predetermined space in the name character string of each of the intersections other than the guidance target intersection.

$$b' = (\text{Character Width} \times \text{Number of Name Characters})/2 + m'b.$$

Then, the display position decision unit 732 decides the display reference point $Q_0(x'_0, y'_0)$ for the name character string of each of the intersections passed through before the guidance target intersection in the screen coordinate system in accordance with the following relationship, in response to the value of the angle a at the closest guidance target intersection.

(a) When 0≤a—180 is Satisfied

The point of intersection of a line at −90 degrees to the entrance link around each of the intersections (intersections passed through before the guidance target intersection) and the circle having the radius b' is defined as the display reference point $Q_0$.

(b) When −180<a<0 is Satisfied or when Closest Guidance Target Intersection is Determined Absent The point of intersection of a line at +90 degrees to the entrance link around each of the intersections (intersections passed through before the guidance target intersection) and the circle having the radius b' is defined as the display reference point $Q_0$.

By this processing, the display reference point $Q_0$ for the name character string of each of the intersections passed through before the corresponding guide target intersection is reached is decided on the side opposite to the direction of a right/left turn at the closest guidance target intersection.

For example, when the name character string is displayed on the left side of the guidance target intersection since the own vehicle turns right at the closest guide target intersection, the name character string of each of the intersections passed through before the corresponding guidance target intersection is reached is also displayed on the left side.

Figure 10:
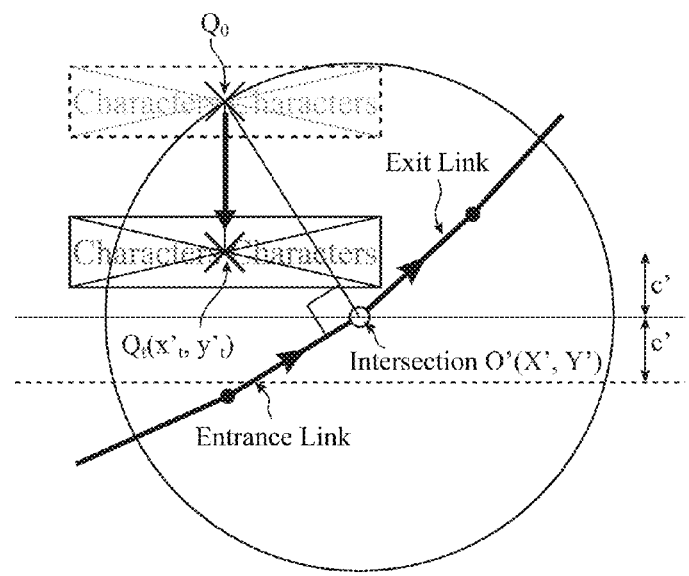
FIG. 10 is a view illustrating decision processing of a display position for the intersection name according to Embodiment 2.

When deciding the display reference point $Q_0$, the display position decision unit 732 compares the coordinates O'(X', Y') of each of the intersections passed through before the closest guidance target intersection to the coordinates of the display reference point $Q_0$ (Step ST10a). In this connection, as shown in FIG. 10, the display position decision unit 732 evaluates a positional relationship between the display reference point $Q_0(x'_0, y'_0)$ and the intersection O'(X', Y') in the screen coordinate system and decides the y-coordinate $(y'_t)$ of the display position $Q_t(x'_t, y'_t)$ of the name character string of the corresponding intersection in response to the evaluation result. The x-coordinate $(x'_t)$ constantly follows the x-coordinate $(x'_0)$ of the display reference point $Q_0$. Note that c' is an arbitrary fixed value obtained by adding a predetermined space to the height of the characters which is set in advance for the name of each of the intersections other than the guidance target intersection.

When $y'_0 > Y' + c'$ (y-Coordinate of Display Reference Point $Q_0$ > y-Coordinate of Intersection (Intersection Other than Guidance Target Intersection)+c') is satisfied (YES in Step ST11a), the display position decision unit 732 fixes $y'_t$ to $y'_t = Y' + c'$ (y-Coordinate of Character String Display Position $Q_t$ = y-Coordinate of Corresponding Intersection+c'). That is, the display position $Q_t$ for the name character string of the corresponding intersection is set to $(x'_0, Y' + c')$ (Step ST13a).

When $y'_0 > Y' + c'$ is not satisfied (NO in Step ST11a) and when $y'_0 < Y' - c'$ (y-Coordinate of Display Reference Point $Q_0$ < y-Coordinate of Intersection (Intersection Other than Guidance Target Intersection)−c') is satisfied (YES in Step ST12a), the display position decision unit 732 fixes $y'_t$ to $y'_t = Y' - c'$ (y-Coordinate of Character String Display Position $Q_t$ = y-Coordinate of Corresponding Intersection−c'). That is, the display position $Q_t$ of the name character string of the corresponding intersection is set to $(x'_0, Y' - c')$ (Step ST14a).

When neither $y'_0 > Y' + c'$ nor $y'_0 < Y' - c'$ is satisfied (NO in Step ST12a), the display position decision unit 732 uses the display reference point $Q_0$ as the display position $Q_t(x'_0, y'_0)$ for the name character string of the corresponding intersection without alteration (Step ST15a).

As mentioned above, in Embodiment 2, the display reference point $Q_0$ of the name character string is decided so as to be on the side opposite to the direction of a right/left turn at each of the intersections passed through before the closest guidance target intersection is reached using the circle having the radius b' determined taking into consideration the character width of the name character string, the number of characters therein, and a predetermined space; the display position $Q_t$ is decided on the basis of the display reference point $Q_0$.

By doing so, the display position $Q_t$ can be decided in such a manner as to prevent the name character string of each of the intersections passed through before the closest guidance target intersection is reached from being overlapped on an entrance-side route to the corresponding intersection and an exit-side route from the corresponding intersection as much as possible.

Every time the own vehicle position is updated in Step ST6a or Step ST7a, the processing from Step ST8a or Step ST9a to Step ST15a described above is performed, which can prevent the display position for the name character string of each of the closest guidance target intersection and the intersections passed through before reaching this from going excessively far away from the position of the intersection due to the rotation of the direction of map display when heading up display is performed.

A drawing data generation unit 733 allocates, on the basis of the attribute information on the corresponding guidance target intersection received from the intersection attribute determination unit 731, and each of the intersections passed through before reaching this, a character size, a drawing color, and the like to the name character string of the intersection to generate drawing data related to the name character string of each of the guidance target intersection and the intersections passed through before reaching this.

An image synthesis unit 8 combines the images generated in a map-element-display control unit 71, a route display control unit 72, and an intersection-name-display control unit 73 to generate map display data to be displayed on a screen of a display device 10.

The map display data becomes image data in which the drawing data on the name character string of the guidance target intersection is displayed at the display position $P_t$ and the display position $Q_t$ decided by the display position decision unit 732. An image data output unit 9 outputs the map display data generated in the image synthesis unit 8 to the display device 10.

Figure 11:
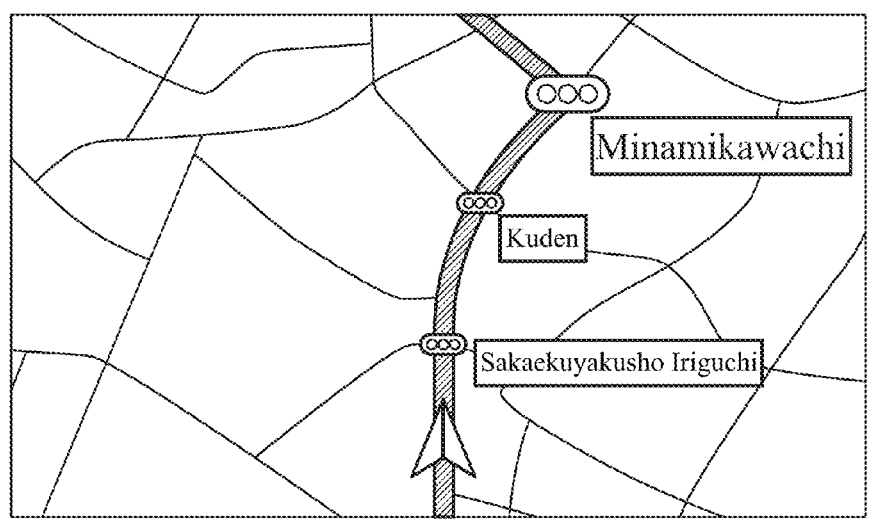
FIG. 11 is a view showing an example of a map screen displaying a name of a guidance target intersection and intersections passed through to get there.

In this manner, a map as shown in FIG. 11 is displayed on the display device 10.

Every time the own vehicle position is updated, the name "Minamikawachi" of the guidance target intersection and the names "Kuden" and "Sakae Kuyakusho Iriguchi" of the intersections passed through before reaching this are displayed on the side opposite to the direction of the right/left turn of the own vehicle at the guidance target intersection. Thus, when there are a plurality of intersections passed through before reaching the closest guidance target intersection, the same processing as the above is performed for each of the intersections.

Note that in the example of FIG. 11, at the display position decided by the display position decision unit 732, a background plate is drawn before the character strings of the names of the guidance target intersection and the intersections passed through before reaching this are drawn.

Also, depending on presence/absence of a traffic signal at the intersection, in other words, whether or not the image of the traffic signal is displayed at the intersection, the value of the radius b' of the circle defined when the display reference point $Q_0$ is decided may be changed.

Further, depending on the size of the image of the traffic signal, the value of the radius b' of the circle defined when the display reference point $Q_0$ is decided may be changed.

Furthermore, a display form of the name character strings of the intersections passed through before reaching the closest guidance target intersection, or the background plate may be set different from that of the guidance target intersection. For example, in FIG. 11, the character size of the name character string of the guidance target intersection is larger than that of the name character strings of the intersections passed through before reaching this, and the background plate is displayed larger accordingly.

Figure 12:
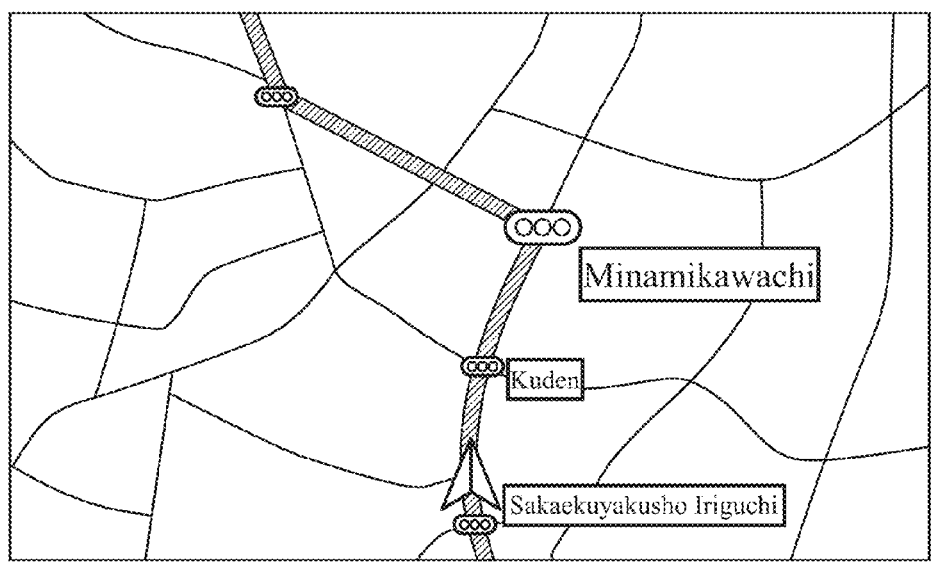
FIG. 12 is a view showing another example of the map screen displaying the name of the guidance target intersection and the intersections passed through to get there.

FIG. 12 is a view showing another example of a map screen displaying the names of the guidance target intersection and the intersections passed through to get there. When the own vehicle passes through a first intersection "Sakae Kuyakusho Iriguchi" located before the closest guidance target intersection "Minamikawachi", the map display is updated as the own vehicle travels and, as shown in FIG. 12, an intersection located ahead of the guidance target intersection "Minamikawachi" on the route is displayed on the map.

Thus, in Embodiment 2, the processing of deciding the display position for the intersection name is performed every time the own vehicle position is updated; thus, even when the map rotates due to the travel of the own vehicle, the name is constantly displayed at a proper position.

Also, in response to the movement of the own vehicle, only the name of the closest guidance target intersection and the names of the intersections passed through before reaching this are displayed.

Note that, when the guidance target intersection is passed through with the movement of the own vehicle, in accordance with the flow of FIG. 8, the display position for the name of the intersection located ahead of the guidance target intersection "Minamikawachi" is decided as the display position for the name of the guidance target intersection located ahead of the corresponding intersection on the route or the destination is decided.

As described above, according to Embodiment 2, the intersection attribute determination unit 731 determines, on the basis of the route information on the corresponding guidance route, the direction of the right/left turn at the closest guidance target intersection on the guidance route; the display position decision unit 732 decides the display positions for the names of the corresponding intersections of the guidance route passed through before reaching the closest guidance target intersection on the side opposite to the direction of the right/left turn determined by the intersection attribute determination unit 731 when viewed from the entrance link to the corresponding intersection; the drawing data generation unit 733 generates the drawing data on the name of each of the intersections passed through before reaching the closest guidance target intersection; and the image data output unit 9 causes the display device 10 to display the drawing data generated by the drawing data generation unit 733 at the display position decided by the display position decision unit 732.

In such a way, when every time the own vehicle position is updated, the display position for the intersection is decided on the side opposite to the direction of the right/left turn of the own vehicle at each of the closest guidance target intersection and the intersections passed through before reaching this, the name of the intersection can be displayed clearly.

In addition, the names of all the intersections on the route acquired from the guidance data are not displayed, but only the names of the closest guidance target intersection and the intersections passed through before reaching this are displayed with the movement of the own vehicle. Thus, this can prevent the display of the route on the map from being intricate and prevent reading of necessary information from being difficult.

Also, according to Embodiment 2, the display position decision unit 732 decides the display reference point $Q_0$ at a position located on the side opposite to the direction of the right/left turn determined by the intersection attribute determination unit 731 when viewed from the entrance link to the intersection and at a predetermined distance from the intersection, and decides the display position for the name of the corresponding intersection on the basis of the display reference point $Q_0$ such that the display position is not excessively far away from the intersection in the vertical direction of the screen coordinate system.

In such a way, when the display position for the name of the intersection is decided on the side opposite to the direction of the right/left turn such that the display position is not excessively far away in the vertical direction, the name is displayed near the intersection without being overlapped on the entrance route. Therefore, the direction of the right/left turn is easily determined on the basis of the position of the name character string and, since the character string is not overlapped on the route, the route and the name character string are easily viewable.

Embodiment 3

In Embodiment 3, a lead line is displayed for the name character string of the intersection for which the display position is decided in the above Embodiment 1. Note that a navigation device according to Embodiment 3 is the same as that in the above Embodiment 1, and the processing of displaying the lead line connecting the image showing the intersection and the image of the name character string of the corresponding intersection is added to the algorithm for the display of the intersection name. Accordingly, see FIG. 3 for a configuration of the navigation device according to Embodiment 3.

Next, a description will be given of an operation.

Figure 13:
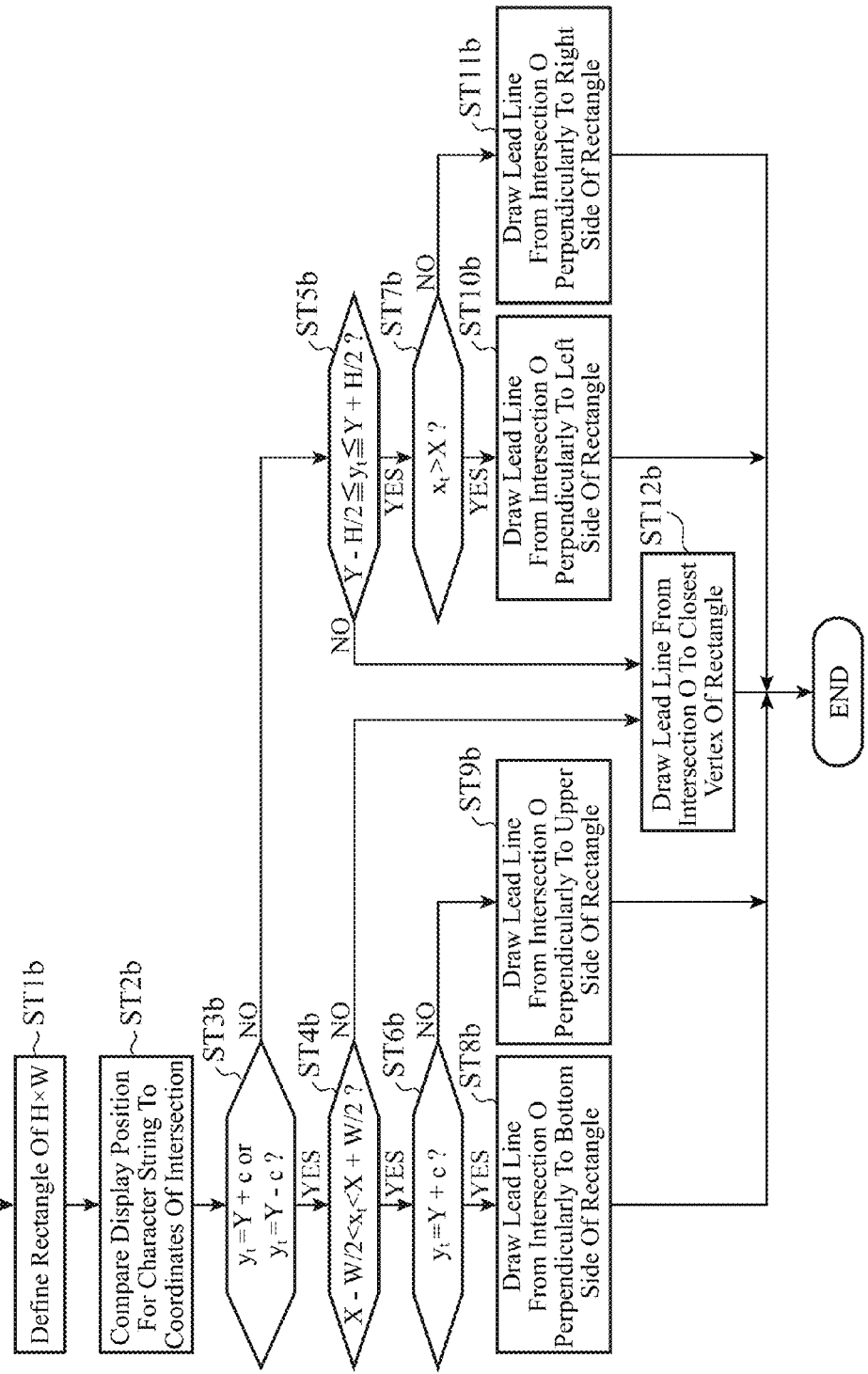
FIG. 13 is a flowchart showing a flow of processing of deciding a lead line connecting the name of an intersection and the position of the intersection by a navigation device according to Embodiment 3 of the invention.

FIG. 13 is a flow chart showing a flow of processing of deciding the lead line connecting the name of an intersection and a position of the intersection by the navigation device according to Embodiment 3 of the invention.

Figure 14:
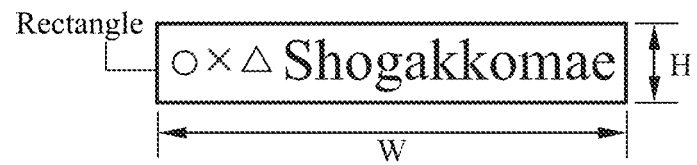
FIG. 14 is a view showing an example of a name character string of an intersection.

First, a drawing data generation unit 733 defines, on the basis of attribute information on a guidance target intersection received from an intersection attribute determination unit 731, as shown in FIG. 14, a rectangle having a height H and a width W as a space to be filled with the name of the guidance target intersection around the name character string (Step ST1$b$).

The height H and width W may be determined in accordance with a character size of the name character string and the number of characters therein, or may have arbitrary fixed values. Note that the center position of the rectangle corresponds to a display position $P_t (x_t, y_t)$.

Next, every time the own vehicle position is updated, the drawing data generation unit 733 compares the display position $P_t (x_t, y_t)$ of the name of the guidance target intersection in the screen coordinate system decided by a display position decision unit 732 to the corresponding guidance target intersection O(X, Y) to determine a positional relationship therebetween (Step ST2$b$). At this time, the following two different cases (1) and (2) are assumed; in either of the cases, the value of the x-coordinate or the y-coordinate at the display position $P_t$ is evaluated and, on the basis of the result, how to draw the lead line is decided.

(1) Case Where $y_t=Y+c$ or $y_t=Y-c$ is Satisfied

When $y_t=Y+c$ (y-Coordinate of Display Position $P_t$=y-Coordinate of Intersection O+c) or $y_t=Y-c$ (y-Coordinate of Display Position $P_t$=y-Coordinate of Intersection O−c) is satisfied (YES in Step ST3$b$), in the drawing data generation unit 733, it is determined whether or not a positional relationship given by $X-W/2<x_t<X+W/2$ is established (Step ST4$b$). At this time, when $X-W/2<x_t<X+W/2$ is satisfied (YES in Step ST4$b$), the drawing data generation unit 733 determines whether or not $y_t=Y+c$ is satisfied (Step ST6$b$).

When $y_t=Y+c$ is satisfied (YES in Step ST6$b$), it follows that a line drawn from the intersection O perpendicularly to the upper side of the rectangle enclosing the character string of the intersection name crosses the upper side of the rectangle.

In this case, the drawing data generation unit 733 generates drawing data in which the lead line is drawn from the intersection O perpendicularly to the upper side of the rectangle (Step ST8$b$).

When $y_t=Y+c$ is not satisfied (NO in Step ST6$b$), it follows that the line drawn from the intersection O perpendicularly to the bottom side of the rectangle enclosing the character string of the intersection name crosses the bottom side of the rectangle.

Figure 15:
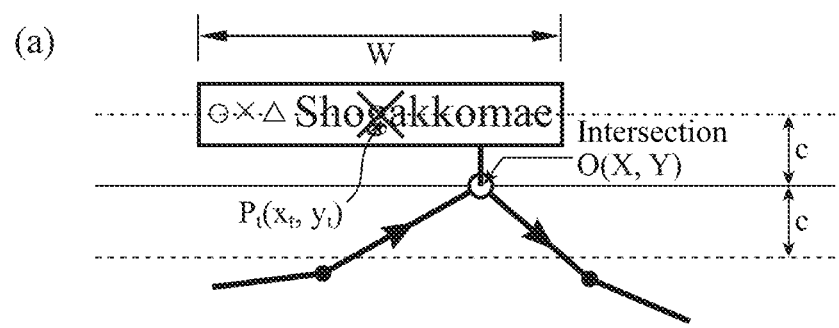
FIG. 15 is a view illustrating a drawing method of a lead line.
Figure 15:
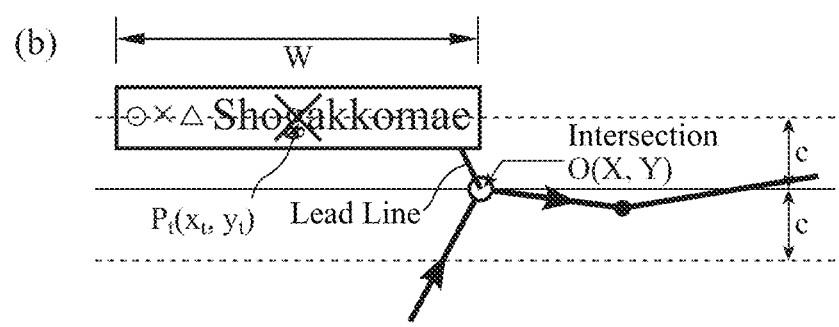

In this case, as shown in FIG. 15($a$), the drawing data generation unit 733 generates drawing data in which the lead line is drawn from the intersection O perpendicularly to the bottom side of the rectangle (Step ST9$b$).

On the other hand, when $X-W/2<x_t<X+W/2$ is not satisfied, that is, when $X-W/2\geq x_t$ or $X+W/2\leq x_t$ is satisfied (NO in Step ST4$b$), the line drawn from the intersection O perpendicularly to the bottom side or upper side of the rectangle enclosing the character string of the intersection name crosses the extension line of the bottom side or upper side of the rectangle.

In this case, as shown in FIG. 15($b$), the drawing data generation unit 733 generates the drawing data in which the lead line is drawn from the intersection O to the vertex of the rectangle closest thereto is generated (Step ST12$b$).

(2) Case Other than Case (1)

When $y_t=Y+c$ or $y_t=Y-c$ is not satisfied (NO in Step ST3$b$) and when $Y-H/2\leq y_t\leq Y+H/2$ is satisfied (YES in Step ST5$b$), the drawing data generation unit 733 determines whether or not $x_t>X$ is satisfied (Step ST7$b$).

When $x_t>X$ is satisfied (YES in Step ST7$b$), it follows that the line drawn from the intersection O horizontally to the right side of the rectangle enclosing the character string of the intersection name crosses the right side of the rectangle.

Figure 16:
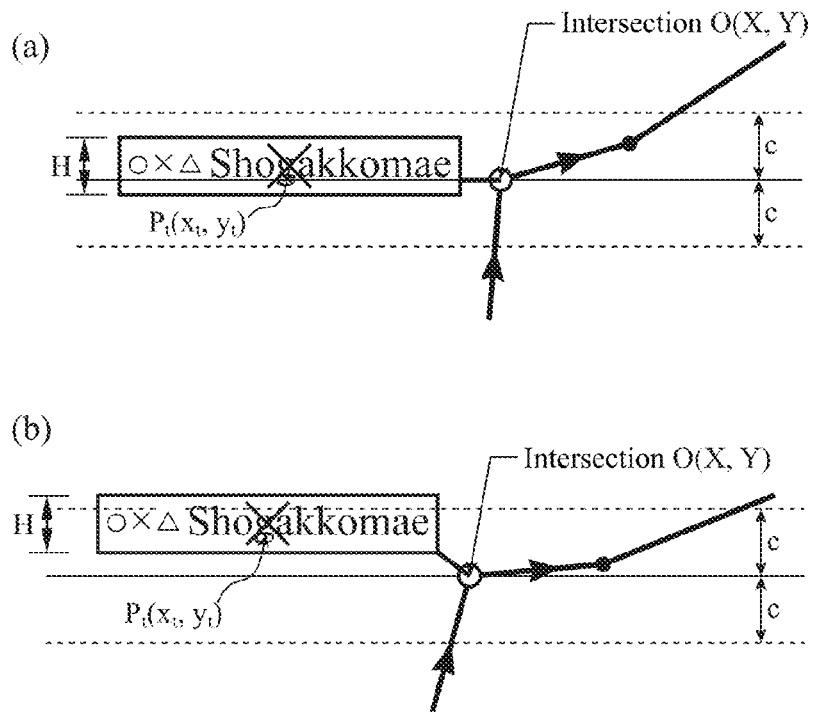
FIG. 16 is a view illustrating another drawing method of the lead line.

In this case, as shown in FIG. 16($a$), the drawing data generation unit 733 generates drawing data in which the lead line is drawn from the intersection O horizontally to the right side of the rectangle (Step ST10$b$).

When $x_t>X$ is not satisfied (NO in Step ST7$b$), it follows that the line drawn from the intersection O horizontally to the left side of the rectangle enclosing the character string of the intersection name crosses the left side of the rectangle.

In this case, the drawing data generation unit 733 generates drawing data in which the lead line is drawn from the intersection O horizontally to the left side of the rectangle (Step ST11$b$).

On the other hand, when $Y-H/2\leq y_t\leq Y+H/2$ is not satisfied, that is, when $Y-H/2>y_t$ or $Y+H/2<y_t$ is satisfied (NO in Step ST5$b$), it follows that the line drawn from the intersection O perpendicularly to the left side or right side of the rectangle enclosing the character string of the intersection name crosses the extension line of the left side or right side of the rectangle.

In this case, as shown in FIG. 16($b$), the drawing data generation unit 733 generates drawing data in which the lead line is drawn from the intersection O to the vertex of the rectangle closest thereto (Step ST12$b$).

An image synthesis unit 8 combines the images generated in a map-element-display control unit 71, a route display control unit 72, and an intersection-name-display control unit 73 to generate the map display data to be displayed on the screen of a display device 10. The map display data corresponds to image data in which the drawing data on the name character string of the guidance target intersection and the rectangle enclosing that string is displayed at the display position $P_t$ and the lead line connecting the guidance target intersection O and the foregoing rectangle is drawn. An image data output unit 9 outputs the map display data generated by the image synthesis unit 8 to the display device 10.

Figure 17:
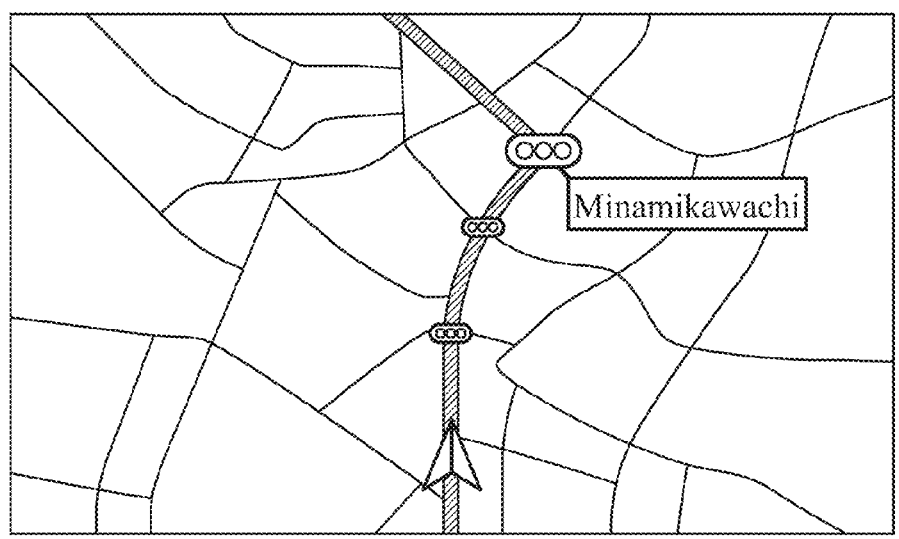
FIG. 17 is a view showing an example of a map screen displaying a name of a guidance target intersection connected to the position of the intersection with the lead line.

FIG. 17 is a view showing an example of the map screen displaying the name of the guidance target intersection connected to the position of the intersection with the lead line. The example shown in FIG. 17 corresponds to the case where the line drawn from the guidance target intersection O perpendicularly to the bottom side or upper side (or the left side or right side) of the rectangle enclosing the name character string of the guidance target intersection crosses the extension line of the bottom side or upper side (or left side or right side) of the corresponding rectangle, and the linear lead line is drawn from the guidance target intersection O to the vertex of the corresponding rectangle closest thereto.

Note that, in the example of FIG. 17, at the display position decided by the display position decision unit 732, a background plate is drawn before the name character string of the guidance target intersection is drawn.

In the aforementioned description so far, there is shown the case in which the lead line showing an association between the guidance target intersection and the name character string thereof is drawn; however, when the aforementioned processing is implemented to each of the intersections passed through before the closest guidance target intersection is reached shown in the above Embodiment 2, the lead line can be similarly drawn.

Figure 18:
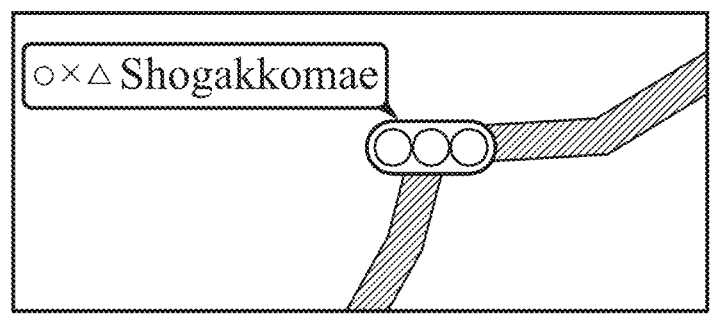
FIG. 18 is a view showing forms of the lead lines.
Figure 18:
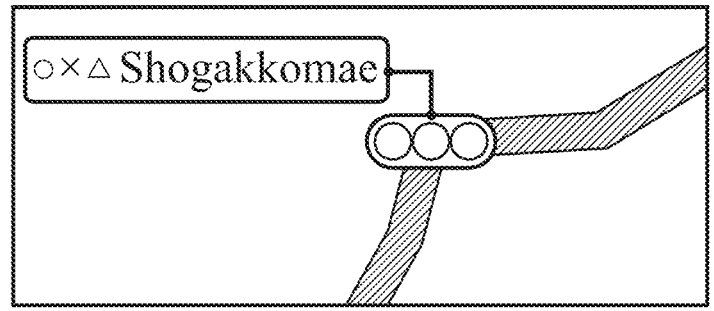

FIG. 18 is a view showing forms of the lead line. The lead line showing the association between the intersection and the name character string thereof may be of a speech-balloon type as shown in FIG. 18 (a) or a hook type as shown in FIG. 18 (b). In this case, similarly to the linear lead line, the above processing is performed to decide whether the lead line is drawn from the intersection O perpendicularly to the bottom side or upper side of the rectangle enclosing the character string of the intersection name or to the left side or right side thereof, or the lead line is drawn from the intersection O to the vertex of the corresponding rectangle closest thereto, and generate drawing data by setting the final form of the lead line to the speech-balloon type or the hook type.

As described above, according to Embodiment 3, the drawing data generation unit 733 draws the lead line connecting the intersection and the name thereof, and thus the association between the position of the intersection and the name of the intersection on the map can be made clearer. For example, in a case where the two intersections are in close proximity or the like, even when the character strings of the intersection names are displayed near the intersections, it is hard to determine which of the intersections is indicated. Even in such a case, when the lead line connecting the intersection and the name thereof are drawn, it is possible to easily visually recognize which intersection name indicates which intersection.

In the above Embodiments 1 to 3, there are shown the cases in which the navigation device according to the invention is applied to an in-vehicle navigation device. However, the navigation device according to the invention may be applied not only to the in-vehicle device, but also, for example, to a mobile phone terminal or a mobile information terminal (PDA as Personal Digital Assistance).

In addition, the navigation device according to the invention may be applied to a PND (Portable Navigation Device) and so on carried by a person into a vehicle and used therein.

It is noted that the present invention can be implemented by a free combination of the embodiments, a modification of arbitrary components of the embodiments, or an omission of arbitrary components of the embodiments, within the scope of the invention.

INDUSTRIAL APPLICABILITY

The navigation device according to the invention can display clearly the intersection name on the route and is therefore suitable for an in-vehicle navigation device.

1 Map Database (DB)
2 Input Unit
3 Map Data Acquisition Unit
4 Own-Vehicle-Position Determination Unit
5 Route Calculation Unit
6 Guidance Data Management Unit
7 Display Control Unit
8 Image Synthesis Unit
9 Image Data Output Unit
10 Display Device
71 Map-Element-Display Control Unit
72 Route Display Control Unit
73 Intersection-Name-Display Control Unit
731 Intersection Attribute Determination Unit
732 Display Position Decision unit
733 Drawing Data Generation Unit.

The invention claimed is:

1. A navigation device displaying a guidance route to a destination on a display to provide guidance, the navigation device comprising:
    a determination unit that determines a direction of a left/right turn at a guidance target intersection on the guidance route on the basis of route information on the guidance route;
    a display position decision unit that decides a display position for a name of the guidance target intersection displayed in the display in conjunction with an movement of an own vehicle at a position which is on a side opposite to the direction of the right/left turn determined by the determination unit when viewed from an entrance link to the guidance target intersection, and which is at a distance corresponding to a width of a character string of the name of the guidance target intersection from the guidance target intersection, in response to update of the position of the own vehicle; and
    an output unit that displays drawing data on the name of the guidance target intersection at the display position decided by the display position decision unit.

2. The navigation device according to claim 1, wherein
the determination unit determines the direction of the right/left turn at the closest guidance target intersection on the guidance route on the basis of the route information on the guidance route,
the display position decision unit decides, with respect to an intersection to be passed through before reaching the closest guidance target intersection of the intersections on the guidance route, the display position for the name of the intersection on the side opposite to the direction of the right/left turn determined by the determination unit when viewed from the entrance link to the intersection, and
the output unit causes the display to display the drawing data on the name of the intersection to be passed through before reaching the closest guidance target intersection at the display position decided by the display position decision unit.

3. The navigation device according to claim 1, wherein
the display position decision unit adjusts the decided display position in a vertical direction of a screen coordinate system.

4. The navigation device according to claim 1, wherein the drawing data generation unit draws a lead line that connects the intersection and the name thereof.

* * * * *